(12) United States Patent
Coccia

(10) Patent No.: US 11,429,380 B2
(45) Date of Patent: Aug. 30, 2022

(54) METHOD FOR CONVERTING SOURCE CODE INTO NUMERIC IDENTIFIERS AND COMPARISON AGAINST DATA SETS

(71) Applicant: Fossid AB, Stockholm (SE)

(72) Inventor: Julian Coccia, Malmö (SE)

(73) Assignee: Fossid AB, Stockholm (SE)

( * ) Notice: Subject to any disclaimer, the term of this patent is extended or adjusted under 35 U.S.C. 154(b) by 0 days.

(21) Appl. No.: 16/141,613

(22) Filed: Sep. 25, 2018

(65) Prior Publication Data

US 2020/0097283 A1    Mar. 26, 2020

(51) Int. Cl.
*G06F 8/72*    (2018.01)

(52) U.S. Cl.
CPC ..................... *G06F 8/72* (2013.01)

(58) Field of Classification Search
CPC ... G06F 8/72; G06F 8/751; G06F 8/42; G06F 21/12; G06F 21/562; G06F 16/381; G06F 16/31
See application file for complete search history.

(56) References Cited

U.S. PATENT DOCUMENTS

| | | | | |
|---|---|---|---|---|
| 10,169,208 B1 * | 1/2019 | Moyes | ............... | G06F 11/3668 |
| 10,572,245 B1 * | 2/2020 | Doebel | ............... | G06F 8/65 |
| 2002/0169744 A1 * | 11/2002 | Cooke | ............... | G06F 16/353 |
| 2002/0194243 A1 * | 12/2002 | Sokolov | ............... | G06F 9/45516 |
| | | | | 718/101 |
| 2003/0225776 A1 * | 12/2003 | Dickey | ............... | G06F 8/4434 |
| 2010/0242028 A1 * | 9/2010 | Weigert | ............... | G06F 21/105 |
| | | | | 717/131 |
| 2014/0109067 A1 * | 4/2014 | Flicker | ............... | G06F 8/427 |
| | | | | 717/142 |
| 2016/0092336 A1 * | 3/2016 | Atanasiu | ............... | G06F 11/323 |
| | | | | 717/133 |
| 2017/0329763 A1 * | 11/2017 | Ganin | ............... | G06F 40/211 |
| 2018/0293380 A1 * | 10/2018 | Lei | ............... | G06F 21/56 |

* cited by examiner

*Primary Examiner* — Jacob D Dascomb
(74) *Attorney, Agent, or Firm* — Chernoff, Vilhauer, McClung & Stenzel, LLP

(57) ABSTRACT

Systems and methods for identifying a characteristic of an input code by converting the input code into simplified code and using the simplified code to generate snippets that can be compared to code in a database. Preferably, code is simplified by at least one of: unifying of capitalization, removing characters, and replacing at least one of a character and a keyword with an identifier.

10 Claims, 4 Drawing Sheets

Figure 4:
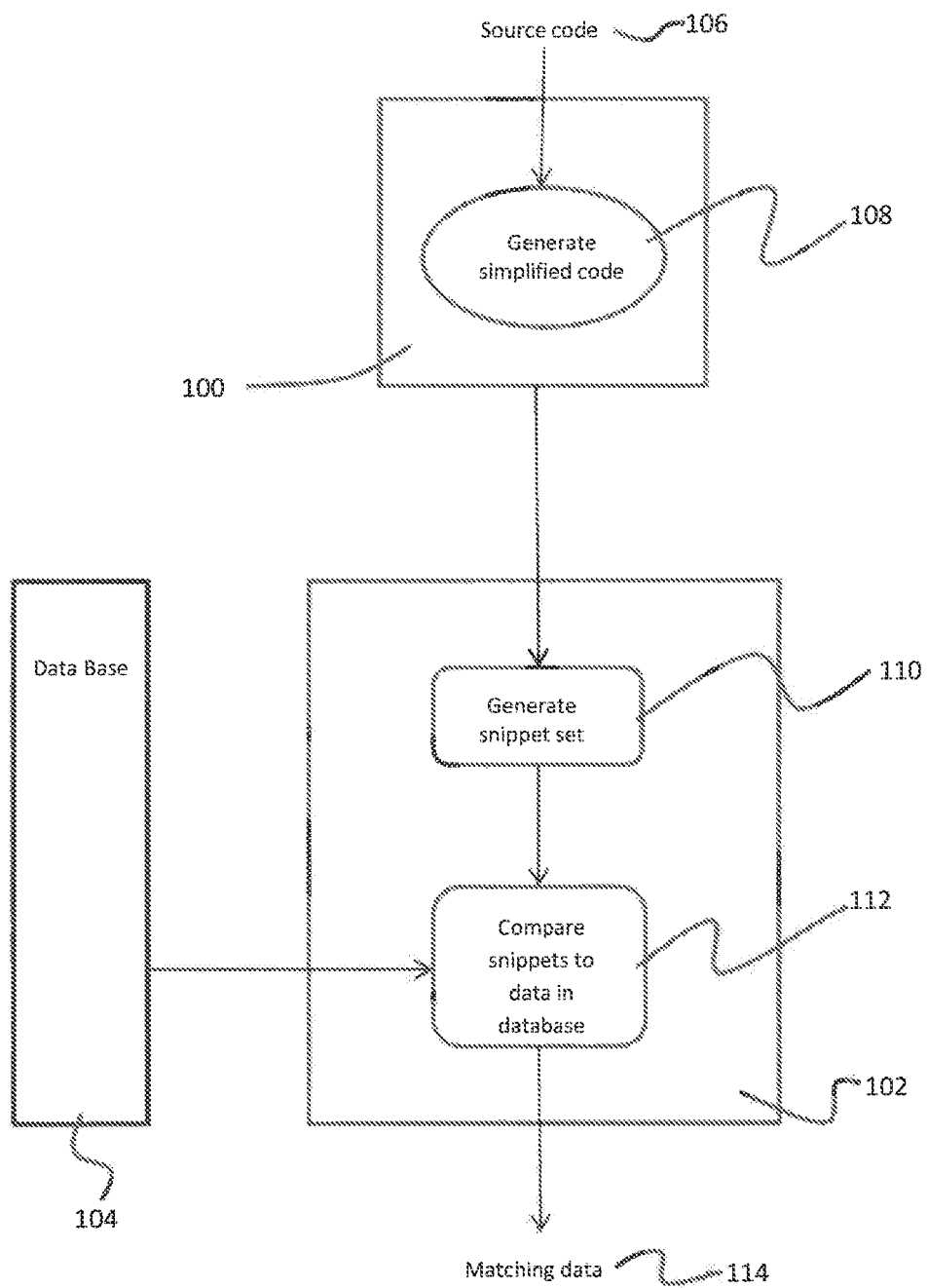

| Original source code | Simplified source code |
|---|---|
| if (argc < 2) usage();<br>for (i=1; i<argc; i++) {<br>    if (!strcmp (argv[i], "-version")) {<br>        fprintf (stderr, "This is %s, version %s\n",<br>            PROGNAME, PROGVERSION);<br>        exit (0);<br>    }<br>} | if (argc < 2) usage()<br>for (i=1<br>i<argc<br>i++)<br>if (!strcmp (argv[i], "-version"))<br>fprintf (stderr,<br>"this is %s, version %s\n",<br>progname, progversion)<br>exit (0) |

FIG. 1

| Simplified source code | MD5 hash | First 36 bits |
|---|---|---|
| if (argc < 2) usage() | 28dcdbf411e49d8d954812ad85dbb4f8 | 28dcdbf41 |
| for(i=1 | 40356bd098cc8c390e02206ab787182c | 40356bd08 |
| i<argc | e6a0916af99b7353c772ad47e720ddfd | e6a0916af |
| i++) | 6eb265da1d0796655266a93c9a03a093 | 6eb265da1 |
| if (!strcmp(argv[i],"-version")) | 8ecc79b23b9d1c759f63e9a1ce2e59d5 | 8ecc79b23 |
| fprintf(stderr, "this is %s, version %s\n", | c9a6d998a0eae88c350dbe1637dbc734 | c9a6d998a |
| progname, progversion) | 9308eae7a0ca4886f9e247de6595c313 | 9308eae7a |
| exit(0) | e3855004ee2d8d80c3779958dd95b84b | e3855004e |

FIG. 2

| Snippet | Line IDs | Snippet IDs |
|---|---|---|
| Lines 1-5 | 28dcdbf4140356bd08e6a0916af6eb265da18ecc79b23 | 36d8faf00 |
| Lines 2-6 | 40356bd08e6a0916af6eb265da18ecc79b23c9a6d998a | e81b7e600 |
| Lines 3-7 | e6a0916af6eb265da18ecc79b23c9a6d998a9308eae7a | 123e64513 |
| Lines 4-8 | 6eb265da18ecc79b23c9a6d998a9308eae7ae3855004e | d018762b3 |

FIG. 3

METHOD FOR CONVERTING SOURCE CODE INTO NUMERIC IDENTIFIERS AND COMPARISON AGAINST DATA SETS

CROSS-REFERENCE TO RELATED APPLICATIONS

Not applicable.

BACKGROUND OF THE INVENTION

The present disclosure generally relates to code processing and data technologies. The increasing popularity of Free and Open Source Code, and the increasing concern about license compliance, leads to the need of building databases with public Free and Open Source Code, with the purpose of identifying inclusion of Free and Open Source Code in a given source code file.

In the existing prior art technology solutions, because of the vast amount of available Free and Open Source Code, indexing and storage represents a big challenge due to database footprint and searching performance. Moreover, the task of analyzing source code is a sensitive matter, while massive duplication of Free and Open Source code for storage into databases might conflict with its respective license conditions.

SUMMARY OF THE INVENTION

The following simplified summary is provided for a basic understanding of some aspects of various invention embodiments described in the present disclosure. The summary is not an extensive overview of the present disclosure. It is neither intended to identify key or critical elements of the claimed invention(s) nor to delineate the scope of the invention. The following summary merely presents some concepts used in embodiments described in the present disclosure in a simplified form as a prelude to a more detailed description of those.

An object of some embodiments described in the present disclosure is to arrange a system and a method for converting source code text, from any programming language, into a series of numeric identifiers for individual source code lines, and for comparing these identifiers to find matches on subsets of lines from other source code files. This is achieved by a method of converting source code into symbolic identifiers and comparing against data sets, wherein the method a source code is used as input code. In the method is produced a simplified source code as output by using at least one of the following method steps: by unifying capitalization, by removing characters, and by replacing at least one of character and keyword with an identifier, and in the method is generated a minimum set of consecutive line identifiers, said minimum set of consecutive lines' identifiers being a snippet, and is found occurrences in data sets, which occurrences match a certain range of the line identifiers in a certain data set.

The focus of some embodiments described in the present disclosure is also a data system for converting source code into symbolic identifiers and for comparing against data sets, in which data system a source code is as input code. The data system comprises a coder unit for producing a simplified source code as output which coder unit is configured to perform at least one of: unifying of capitalization, removal of characters, and replacement of at least one of character and keyword with an identifier, and the data system comprises a comparison unit, which is configured: to generate a minimum set of consecutive line identifiers, said minimum set of consecutive lines' identifiers being a snippet, and to found occurrences in data sets, which occurrences match a certain range of the line identifiers in a certain data set.

The embodiments described herein may be based on production of a simplified source code as output by using at least one of the following method steps: by unifying capitalization, by removing characters, and by replacing at least one of character and keyword with an identifier. The embodiments described herein may be further based on comparison of the identifier against data sets by generating a minimum set of consecutive line identifiers, which produce a match.

A benefit of the embodiments described herein may be that they may allow comparison of software by comparing its numeric identifiers, without having the originating source code. Also, data footprint is reduced by the need to only store numeric identifiers. Furthermore, database searches are simplified by having searches reduced to fixed-length numeric comparisons on datasets with nearly perfectly balanced indexes The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Exemplifying and non-limiting embodiments of the present disclosure and their advantages are explained in greater detail below with reference to the accompanying drawings, in which:

FIG. 1 presents the process of simplification of source code text according to an exemplifying and non-limiting embodiment of the present disclosure.

FIG. 2 presents the process of line identifiers' generation for the simplified code text in FIG. 1 according to an exemplifying and non-limiting embodiment of the present disclosure.

FIG. 3 presents the snippet ids for the source code shown FIG. 2 according to an exemplifying and non-limiting embodiment of the present disclosure.

FIG. 4 presents a system flowchart according to an exemplifying and non-limiting embodiment of the present disclosure.

DETAILED DESCRIPTION OF PREFERRED EMBODIMENTS

The embodiments described herein allow the comparison of source code against a dataset without having copies of the originating source code for those data sets. These embodiments also allow line ID generation and database search to be separated in different locations. Therefore, the individual performing the database search does not need access to the code being compared, but only access to the generated line IDs. This logic isolation allows database searches to be done without accessing either the originating code, or the originating source code that the comparison is made against.

In addition, the embodiments described herein allow for a reduced storage footprint by saving only snippet IDs (not source code) from large datasets, and reduced processing times and fast search responses, due to the fact that searches are performed against fixed-length balanced indexes, which is a consequence of the uniform data distribution nature provided by cryptographic hash algorithms.

The term "large data set" is meant to include data sets with more than a billion records, and even up to multiple trillions results. Embodiments described herein can be also utilized with smaller data sets so the size of the data set is not a restricting factor.

Source code text can be converted into numeric identifiers, allowing quick comparison between different source code files, with tolerance to changes in coding conventions, tabulation and other syntax differences in the source code texts. Resulting numeric identifiers cannot be converted back to the original source code. This method allows finding source code matches by comparing identifiers without the need of retaining the originating source code texts.

The embodiments described herein achieve a quick and effective comparison of a source code against e.g. a large database of previously stored source code line identifiers. Some embodiments described herein may perform three steps: simplification, generation of identifiers, and comparison.

The generation of numeric identifiers may include two steps: simplification and identification. The simplification step preferably converts the text into a neutral state that allows finding source code matches regardless of changes in source code indentation, changes in coding conventions, empty lines or spaces, inclusion or exclusion of irrelevant texts, or changes in capitalization of source code instructions.

The simplification takes original source code as input and produces simplified source code as output by applying a series of rules. These rules are divided into: a) unifying capitalization, b) replacement of certain characters or keywords and c) replacement of certain characters or keywords (line separators) with chr(10), which corresponds with line feed or new line, d) elimination of empty lines or lines with less characters than a predefined threshold.

The resulting simplified code contains a minimum amount of code in each line. For example, assuming a simple configuration for the C programming language, using only brackets and semicolons ({ };) as separators, without making any text replacements with an empty line threshold of 1 byte, the source code is converted as presented in FIG. 1.

Identification is performed by generating fixed-length identifiers on the already simplified source code lines. In order to ensure an even distribution of identifier data, a cryptographic hash algorithm is selected, and the resulting hash (or part of) is used as a line identifier.

For example, provided that the MD5 hash algorithm is used, and the line ID length is chosen to be 36 bits, the line identifiers for the previous example are presented in FIG. 2. The resulting list of line IDs for the original source code is therefore: 28dcdbf4140356bd08e6a0916af6eb265da18ecc-79b23cga6d998a9308eae7ae7ae3855004e.

In this exemplary case, the chosen 36 bits as a line ID identifier provides about 68 billion possible IDs, which will certainly result in collision on large amounts of data. However, collisions are resolved by the data comparison method.

In comparison step of source code numeric identifiers, a minimum set of consecutive lines should be set to produce a match. This set of lines is called a snippet. A minimum number of consecutive snippets is defined as a threshold to produce a match, in order to discard false matches from eventual line ID collisions.

False identification can be avoided in the embodiments described herein. If an amount of bits chosen for the fixed-length line identifier is called (W), and the minimum number of line matches required is called (N), then the smaller is W, the bigger that N must be to prevent false-positive identification. Specifically, the smaller is W becomes, the more likely collisions (i.e. different lines having the same identifier) become. This can be mitigated by requiring more consecutive lines to match the same file in the database. The chances of multiple consecutive lines colliding decreases exponentially as the value of N is increased.

The method for comparing source code is composed by three steps: generating snippet IDs, searching for a minimum of X consecutive snippet ID occurrences, and selecting the file(s) with the most matches.

Generation of snippet identifications (IDs) can be performed by applying the same algorithm as for generating line IDs, on a given list of line IDs. For example, given the source code in FIG. 1, and considering a snippet size of 5 lines, the line IDs for the first snippet would be the concatenation of the first 5 line IDs: 28dcdbf4140356bd08e 6a096aaf6eb265da18ecc79b23. The MD5 hash for that string is 36d8faf00c3d3d1fd6065737b0c4cf8f, where the first 36 bits of that MD5 hash is 36d8faf00, which is the first snippet ID.

FIG. 3 shows snippet IDs for four sequential snippets of the source code shown in FIG. 2, each snippet having five lines of code.

Searching assumes a database is loaded with snippet IDs for the source code that the search will be performed against, along with the corresponding meta-data from originating source code files. Note that this database does not need to contain the original source code, but instead just the snippet IDs and meta-data from the originating code, including but not limited to filenames, originating source code location, component/artifact name, etc.

Searching the database is preferably performed by seeking snippet IDs, and collecting from the database a list of file IDs that match each snippet ID. Files with less than the desired number of consecutive snippet match occurrences (X), are preferably discarded. Results may preferably be sorted by highest to lowest number of snippet match occurrences.

FIG. 4 shows a system and flowchart according to an exemplifying and non-limiting embodiment of the present disclosure. The system preferably comprises a coder unit 100 and a comparison unit 102 that is operably connected or connectable to a database 104. The coder unit is configured at step 106 to receive an input source code and at step 108 to convert the input source code into a simplified source code as output to the comparison unit 102. The coder 100 unit is configured to perform at least one of the following functions: unifying of capitalization, removal of characters, and replacement of at least one of character and keyword with an identifier. The data system can be configured to replace at least one of character and keyword with chr(10) as an identifier, which corresponds with at least one of the line feed code and the new line code. The identifiers can be numeric identifiers. The identifier can be configured to correspond with at least one of a line feed code and a new line code.

The comparison unit 102 receives the simplified source code and at step 110 uses that code to generate, in the manner previously described, a minimum set of snippet IDs, i.e. alphanumeric codes each representing sequential respective sets of a consecutive number of coded line identifiers. The comparison unit at step 112 the compares the snippets previously generated to those in coded data stored in the database 104 to identify any matching code in the database.

The comparison unit 102 preferably outputs and/or stores the data sets with most matches.

Those of ordinary skill in the art will understand that alternative embodiments or variations to the system shown in FIG. 4 are readily implemented. For example, in some embodiments the coder unit 100, in addition to generating simplified code from an input, may also generate snippets of that code and snippet IDs for the generated snippets and forward those snippet IDs to the comparison unit, which in turn simply performs the comparison of such IDs to those in the database 104.

Generation of line identifiers can be performed by calculating a numeric identifier for each line of the resulting simplified code. A fixed-length identifier is generated by using a cryptographic hash, or part of it, as a fingerprint or identification (ID) for each line of simplified code.

In an exemplary embodiment according to the present invention the comparison can be performed by comparing line identifiers with those stored in a database. A coincidence or match can be found when a minimum number of consecutive line identifiers match.

In one exemplary embodiment, the data system can be configured to define a threshold amount of characters, and to eliminate empty lines and lines with less characters than the predefined threshold amount of characters. By "threshold amount of characters", is meant defining a minimum number of characters as a threshold, under which the line is entirely ignored. In other words, after executing code simplification, if the line is less than X characters, then the line is simply ignored. Also, the data system can be configured to search for a defined minimum number of consecutive snippet occurrences.

In the system and flow chart of FIG. 4, the main operations according to one preferred embodiment of the present disclosure is receiving a source code as input, producing a simplified source code, generating a minimum set of consecutive line identifiers, and finding occurrences in the existing data sets that match a certain range of line identifiers in a certain data file.

The data system can be configured to generate the snippets by applying the same algorithm as for generating line identifiers, on a given list of lines. The data system, e.g. the coder unit 100 and the comparison unit 102, can be implemented e.g. by processor based computer and microprocessor techniques to use the algorithms and to implement the methods according to the present invention.

The specific examples provided in the description given above should not be construed as limiting the scope and/or the applicability of the appended claims.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A computer-implemented method of matching input source code to corresponding code stored in a database, the method performed by a processing device, the method comprising:
    simplifying the input source code to produce a simplified source code, by performing at least one of: (i) unifying capitalization; (ii) removing characters; and (iii) replacing at least one of a character and a keyword with an identifier;
    using a cryptographic hash algorithm on the simplified source code to generate a plurality of line IDs each representing the content of a line of code;
    using the plurality of line IDs to generate a plurality of snippets, each representing a subset of the plurality of line IDs;
    using the plurality of snippets to generate a plurality of input snippet IDs by applying the same cryptographic hash algorithm as was used to generate the plurality of line IDs; and
    matching the input source code to corresponding code stored in the database by searching, in a database loaded with one or more stored files each represented by a plurality of dataset snippet IDs, for stored files having at least a threshold minimum number of consecutive dataset snippet ID match occurrences, wherein stored files having less than said threshold minimum number of consecutive dataset snippet ID match occurrences are discarded from the search, and thereafter filtering the remaining stored files based on a comparison of a number of dataset snippet IDs in each respective remaining stored file that match an input snippet ID.

2. The method of claim 1 where the line IDs are numeric identifiers.

3. The method of claim 1 where the identifier corresponds with at least one of a line feed code and a new line code.

4. The method of claim 1 where the simplified source code is produced by at least one of: (i) defining a threshold amount of characters; (ii) eliminating empty lines; and (iii) eliminating lines with less characters than a predefined threshold amount of characters.

5. The method of claim 4 where at least one of a character and a keyword is replaced with an identifier that corresponds to at least one of a line feed code and a new line code.

6. A system for matching input source code to corresponding code stored in a database, the system comprising:
    a coder unit in a processor that simplifies the input source code into a simplified source code by performing at least one of: (i) unifying capitalization; (ii) removing characters; and (iii) replacing at least one of a character and a keyword with an identifier;
    a comparison unit in a processor that (i) uses a cryptographic hash algorithm on the simplified source code to generate a plurality of line IDs each representing the content of a line of code; (ii) generates a plurality of snippets, each representing a subset of line IDs; (iii) uses a plurality of snippets to generate a plurality of snippet IDs by applying the same cryptographic hash algorithm as was used to generate the plurality of line IDs; and (iv) matches the input source code to corresponding code stored in the database by searching, in a dataset loaded with one or more stored files each represented by a plurality of dataset snippet IDs, for stored files having at least a threshold minimum number of consecutive dataset snippet ID match occurrences, wherein stored files having less than said threshold minimum number of consecutive dataset snippet ID match occurrences are discarded from the search, and thereafter filtering the remaining stored files based on a comparison of a number of dataset snippet IDs in each respective remaining stored file that match an input snippet ID.

7. The system of claim 6 where the line IDs are numeric identifiers.

8. The system of claim 6 where the identifier corresponds with at least one of a line feed code and a new line code.

9. The system of claim 6 where the simplified source code is produced by at least one of: (i) defining a threshold amount of characters; (ii) eliminating empty lines; and (iii) eliminating lines with less characters than a predefined threshold amount of characters.

10. The system of claim 9 where at least one of a character and a keyword is replaced with an identifier that corresponds to at least one of a line feed code and a new line code.

\* \* \* \* \*